May 5, 1959     F. K. KELEMEN     2,885,228

FLUX-CHARGED ARC WELDING STUDS

Filed June 2, 1951

INVENTOR
Frank K. Kelemen
BY
Brown and Mikulka
ATTORNEYS

United States Patent Office 2,885,228
Patented May 5, 1959

2,885,228

FLUX-CHARGED ARC WELDING STUDS

Frank K. Kelemen, Haddonfield, N.J., assignor to KSM Products, Inc., Merchantville, N.J., a corporation of New Jersey Application June 2, 1951, Serial No. 229,627

2 Claims. (Cl. 287—20.2)

This invention relates to electric arc welding of the type wherein a metal stud is end welded to a metallic body, and more particularly to arc welding studs and to processes for making the same.

It is one object of the present invention to provide an improved flux-loaded arc welding stud in which an integral extension of the metal of the stud body provides the work-engaging extremity of the stud and serves, during the weld cycle, to make the initial contact with the metallic body to which the stud is being welded.

It is another object of the invention to provide an arc welding stud possessing the aforesaid novel features wherein the work-engaging extremity cooperates in a novel manner with the flux charge to provide a finished stud which is capable of being readily and economically fabricated and assembled, which can be more accurately located during the weld cycle, and which gives more uniform and stronger welds.

A still further object is to provide a stud in which the said integral extension is a central tip or nipple and the flux is in the form of a unitary element surrounding said tip.

Further objects are to provide a stud of the foregoing improved construction wherein the fluxing element has its mass relatively, uniformly distributed over substantially the entire weld end of the stud; wherein the fluxing element is securely held in position by other extensions of the stud body; wherein said other extensions engage and hold the periphery of the fluxing element; wherein the fluxing element is concentrated adjacent the central extension or tip of the stud body; and wherein the fluxing element is positively held by the central tip of the stud.

Still another object is to provide an improved method of flux loading the weld end of the stud.

Other objects of the invention will in part be obvious and will in part appear hereinafter.

The invention accordingly comprises the several steps and the relation of one or more of such steps with respect to each of the others, and the product possessing the features, properties and the relation of elements which are exemplified in the following detailed disclosure and the scope of the application which will be indicated in the claims.

For a fuller understanding of the nature and objects of the invention, reference should be had to the following detailed description taken in connection with the accompanying drawings wherein.

In the end welding of studs to a plate or other metallic body, as performed semiautomatically by a welding gun, the stud end is brought into contact with the body to complete the electrical circuit for the passage of the welding current, and after contact is thus achieved the stud is lifted from the body to create the arc whereupon the adjacent portions of the stud and the body are raised to fusion temperatures. It is important, in the elimination of misfires and in the achievement of uniform, strong and dense welds, that good electrical contact be obtained during the initial stage of the weld cycle and that the fluxing material be relatively, uniformly distributed over substantially the entire cross-sectional area of the weld end of the stud during the creation of the arc. According to the present invention, these desirable objectives are achieved in a stud construction which is extremely simple and which requires for its fabrication a minimum of manufacturing operations and components.

In the preferred form of the novel stud, the body of the stud is provided at its weld end with an integral extension which depends downwardly therefrom, the fluxing material being so mounted with respect thereto that the end surface of said extension provides the surface that makes initial contact with the metallic body to which the stud is being welded. Preferably, this extension is centrally located with respect to the weld end of the stud and is surrounded by the mass of fluxing material, the latter being in the form of a single, solid, relatively flat element. In general the stud body is formed of a ferrous metal, such as steel, and the fluxing material is formed of a ductile metal, such as aluminum or titanium.

Figure 1:
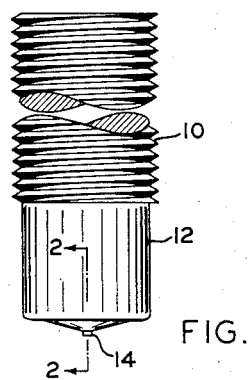
Figure 1 is a view in elevation, with parts broken away, of one type of stud construction comprehended by the present invention.
Figure 2:
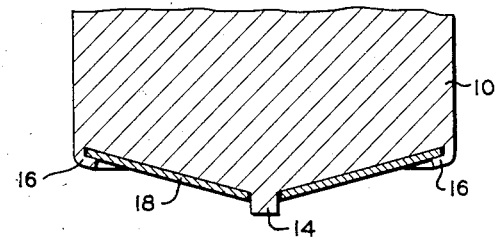
Fig. 2 is a fragmentary axial sectional view taken substantially along the line 2—2 of Fig. 1 and showing the structural details of the weld end of the stud of Fig. 1.
Figure 3:
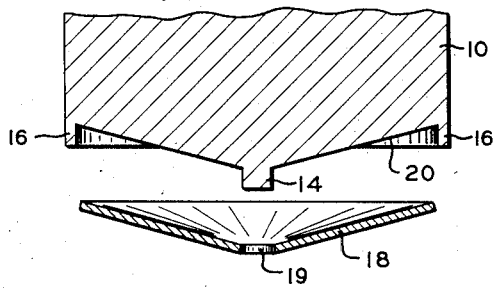
Fig. 3 is an exploded view showing one stage in the fabrication of the stud structure of Fig. 2.

Referring now to Figs. 1 through 3, there is illustrated by way of example a flux-charged arc welding stud which embodies one form of the present invention, said stud comprising a shank 10 and a weld end 12. The shank 10, as shown, is of standard threaded construction capable of suitably receiving a nut for bolting down flooring or the like, but it is to be understood that the present invention is not limited to this or any other specific type of shank structure. The shank portion 10 of the stud may, for example, be an eye-bolt, a metal lath, a hook, a lagging, a stirrup or the like. Moreover, although the stud and especially the weld end 12 thereof is shown in the illustrated examples as being of a cylindrical shape, the novel features thereof which are hereinafter more fully described are equally applicable to studs of various other shapes.

As shown in greater detail in Fig. 2, the weld end 12 of the stud is provided with a central tip 14 which is integrally formed with the body of the stud, the term "stud body" being hereinafter employed to distinguish the main portion of the weld end of the stud from the fluxing charge secured thereto. Adjacent the peripheral edges of the stud end is a depending flange or skirt 16 which serves to hold in place a disk-like solid element 18 of fluxing material, for example aluminum, said flange or skirt being crimped or otherwise deformed around the peripheral edges of the fluxing material to securely hold the latter in position. The end surface 20 of the stud, which connects tip 14 to peripheral flange 16, has a frusto-conical shape and fluxing element 18 conforms to this shape. The nature of the manufacturing operation which produces central tip 14 makes possible the very accurate location of the latter at the center of the stud and the use of the metal of the stud body as the work-engaging surface of the stud assures good electrical contact during the initial stage of the welding cycle. The disposition of the fluxing material over substantially the entire end surface of the stud tends to give a more uniform weld and the provision of a flange 16, which is crimped or otherwise deformed around the periphery of element 18, provides a positive holding means for said element.

In the construction of a stud of the type shown in Fig. 2, a very simple fabrication and assembly operation is involved. The weld end of the stud proper is formed to the contour shown in Fig. 3, i.e., is provided, preferably in a simple cutting or other shaping operation, with the welding tip 14, the essentially frusto-conical surface 20 and the uncrimped depending peripheral flange 16. Thereafter a disk 18 of the fluxing material, provided with a central recess 19 large enough to loosely receive tip 14, is positioned over said tip and into substantial engagement with surface 20. In one type of assembly, the fluxing element 18 is preformed to its conical shape prior to being positioned in the weld end of the stud. In still another mode of assembly, the fluxing element 18 is originally in the form of a flat, substantially planar disk and is formed to the shape of surface 20 as it is positioned upon the stud end by being pressed into said position. After element 18 is properly positioned in the end of the stud, the depending flange 16 has its end crimped or otherwise pressed into engagement with the peripheral edges of said element to firmly secure the latter.

Figure 4:
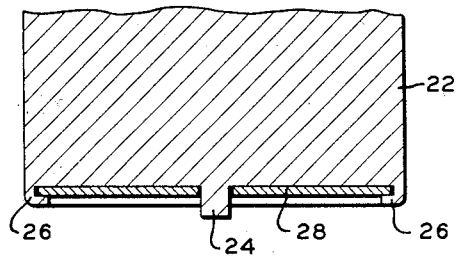
Fig. 4 is a view similar to Fig. 2 of another modification of the stud structure of the invention.

In another embodiment of the present invention, as illustrated in Fig. 4, the weld end of the stud is provided, as in the aforementioned embodiment, with a central tip 24 integrally formed with the body of the stud and a depending peripheral flange 26 and has a disklike fluxing element 28 secured in the end thereof by means of said flange. However, in this form of the stud the shape of the fluxing material, and the surface of the weld end which it engages, is substantially planar rather than frusto-conical in shape. Central tip 24 preferably has the end or tip surface thereof located below the tip surface of the flange 26 so that it initially contacts the plate or other body to which the stud is to be welded.

In each of the foregoing embodiments a plurality of fingers or individual projections, located adjacent the periphery of the stud end, may be employed to hold the fluxing element in position instead of the continuous peripheral extensions or flanges 16 and 26. Moreover, although it is preferable to positively fix the fluxing element, as hereinabove shown, it is entirely satisfactory for certain purposes to secure the fluxing element solely by means of a force-fit so that the last operation in the formation of the stud is the pressing of the element of fluxing material into its final position.

Figure 5:
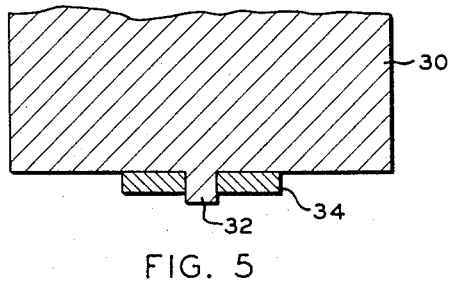
Figs. 5 and 6 are views similar to Fig. 2 showing still further embodiments of the stud structures of the invention.

Still another embodiment of the invention is illustrated in Fig. 5 and comprises a structure which permits of extremely simple assembly. As shown, said embodiment comprises a stud end 30 which is provided with an integrally formed central tip 32 and surrounding tip 32 is the fluxing element 34. Element 34 is frictionally held by tip 32 so that the stud can be assembled merely by forc-ing element 34, which is in the form of a washer, onto tip 32. It is preferable, in this form of the invention, to have the fluxing element somewhat thicker in shape than the fluxing element of the prior embodiments in order to obtain a more secure engagement between said element and tip 32, and accordingly since element 34 is of uniform thickness, its mass is concentrated adjacent the central portion of the flux end. Although in this form of the stud no peripheral flange or skirt is shown, it may be desirable in some instances to provide such a flange or skirt adjacent the peripheral end of the stud to assure an initiation of the arc throughout an area which is substantially equal to the maximum cross-sectional area of the stud end. It may also be desirable to form element 34 so that it has a thickened or hub portion adjacent tip 32 and to have the remainder of the mass thereof distributed in a thin sheet over a greater area of the end surface of the stud body.

Figure 6:
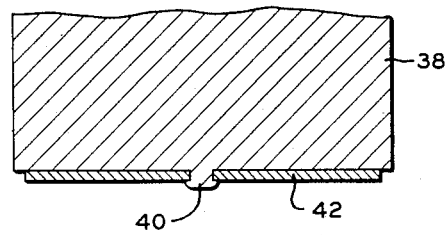

Still another modification of the stud structure of the present invention is shown in Fig. 6. In this form the stud end 38 is provided with a central tip 40 and surrounding said tip is a flat, disklike fluxing element 42 which covers substantially the entire end surface of the stud and which is positively held in position by the central tip 40. Element 42 and the end surface of the stud body are essentially planar, as shown, but may, of course, be frusto-conical in shape as shown in Fig. 2. Central tip 40 is preferably peened or otherwise deformed after fluxing element 42 is positioned thereon so that its end is enlarged and projects over the inner peripheral edges of element 42 to firmly secure the latter to the stud end.

There is thus provided a novel stud structure which can be simply and economically machined and fabricated and which, in use, will give uniformly good welds. By having the body of the stud provide the work-engaging surface, good electrical contact is assured during the initial stage of the welding cycle. In the preferred form of the invention, the integral extension of the stud body which provides the work-engaging surface is very accurately located at the center of the stud and thus makes possible an equally accurate positioning of the stud during the welding operation. In addition, in the preferred form of the stud structure there is provided a distribution of the solid fluxing material which assures a greater uniformity throughout the cross section of the weld and the stud structure, while extremely simple and economical to fabricate, provides a positive means for securing the fluxing element in the end thereof.

Since certain changes may be made in the above product and process without departing from the scope of the invention herein involved, it is intended that all matter contained in the above description, or shown in the accompanying drawings, shall be interpreted as illustrative and not in a limiting sense.

What is claimed is:

1. An arc welding stud comprising a stud body having a central tip formed in the weld end thereof and a peripheral flange surrounding said central tip, and a preformed, self-sustaining disk of fluxing material positioned to substantially cover the end surface of said weld end and entirely located between said central tip and said peripheral flange, said peripheral flange being deformed, at least in part, to positively engage and hold said fluxing disk, said central tip extending through a recess in the center of said disk and constituting the foremost portion of said stud, said fluxing disk providing a substantial area of the outermost end surface of said stud.

2. An arc welding stud comprising a stud body having a central tip formed in the weld end thereof and a peripheral flange surrounding said central tip, and a preformed, self-sustaining disk of fluxing material positioned to substantially cover the end surface of said weld and entirely located between said central tip and said peripheral flange, said peripheral flange being deformed, at least in part, to positively engage and hold said fluxing disk, said central tip extending through a recess in the center of said disk and constituting the foremost portion of said stud, the end surface of said stud covered by said fluxing disk being generally of frusto-conical shape, said fluxing disk conforming to said shape and providing a substantial area of the outermost end surface of said stud.

References Cited in the file of this patent

UNITED STATES PATENTS

| | | |
|---|---|---|
| 586,438 | Inshaw | July 13, 1897 |
| 1,004,795 | Lachman | Oct. 3, 1911 |
| 1,814,703 | Johnson | July 14, 1931 |
| 2,122,477 | Leonard | July 5, 1938 |
| 2,156,692 | Hixon | May 2, 1939 |
| 2,277,109 | Jochim | Mar. 24, 1942 |
| 2,402,659 | Nelson | June 25, 1946 |
| 2,413,370 | Palmer | Dec. 31, 1946 |
| 2,441,257 | Candy | May 11, 1948 |
| 2,455,244 | Evans | Nov. 30, 1948 |
| 2,586,087 | Reynolds | Feb. 19, 1952 |
| 2,638,525 | Candy | May 12, 1953 |

FOREIGN PATENTS

| | | |
|---|---|---|
| 160,127 | Great Britain | Mar. 17, 1921 |